US008935573B2

(12) United States Patent
Horsman et al.

(10) Patent No.: US 8,935,573 B2
(45) Date of Patent: Jan. 13, 2015

(54) RELIABLE UNIT TESTING THROUGH CACHED MOCKING

(75) Inventors: Steven J. Horsman, Farnborough (GB); Kathleen Sharp, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 13/597,716

(22) Filed: Aug. 29, 2012

(65) Prior Publication Data

US 2014/0068334 A1  Mar. 6, 2014

(51) Int. Cl.
*G06F 11/28* (2006.01)

(52) U.S. Cl.
USPC .......................................................... 714/32

(58) Field of Classification Search
USPC .......................................................... 714/1–57
See application file for complete search history.

(56) References Cited

U.S. PATENT DOCUMENTS

| | | | | |
|---|---|---|---|---|
| 7,496,791 | B2 * | 2/2009 | Tillmann et al. | 714/25 |
| 7,587,636 | B2 | 9/2009 | Tillmann et al. | |
| 7,954,091 | B2 * | 5/2011 | Li et al. | 717/135 |
| 8,127,268 | B2 * | 2/2012 | Fernandez-Ivern et al. | 717/101 |
| 8,359,581 | B2 * | 1/2013 | Ortiz | 717/128 |
| 8,627,296 | B1 * | 1/2014 | Picard | 717/135 |
| 2007/0033442 | A1 * | 2/2007 | Tillmann et al. | 714/45 |
| 2007/0277158 | A1 | 11/2007 | Li et al. | |
| 2009/0271770 | A1 | 10/2009 | Nir-Buchbinder et al. | |
| 2010/0077381 | A1 | 3/2010 | Allen et al. | |
| 2011/0239194 | A1 | 9/2011 | Braude | |

OTHER PUBLICATIONS

Freeman, S. et al., "Mock Roles, Not Objects," Companion to the 19th ACM SIGPLAN Conf. on Object-Oriented Programming Systems, Languages and Applications (OOPLSA '04) Oct. 24-28, 2004, <www.jmock.org/oopsla2004.pdf>, 11 pgs.
Freeman, S. et al., "Evolving an Embedded Domain-Specific Language in JAVA," In OOPSLA '06, Companion to 21st ACM SIGPLAN Conf. on Object-Oriented Programming Systems, Languages, and Applications, Oct. 22-26, 2006, <http://static.mockobjects.com/files/evolving_an_edsl.ooplsa2006.pdf>, 9 pgs.
Mackinnon, T. et al., "Endo-Testing: Unit Testing with Mock Objects," In eXtreme Programming and Flexible Processes in Software Engineering—XP2000 and XP eXamined, Addison-Wesley, <stalatest.googlecode.com/svn/trunk/Literatur/mockobjects.pdf>, 9 pgs.
Lopes, C.V. et al., "Unit-Testing Aspectual Behavior," In Proc. AOSD '05 Workshop on Testing Aspect-oriented Programs, 4th Int'l Conf on Apsect-Oriented Software Development, Mar. 2005, <http://www.isr.uci.edu/~lopes/documents/wtaop%2005/lopes-ngo-aosd05-wtaop-jamlunit.pdf>, 6 pgs.

* cited by examiner

*Primary Examiner* — Nadeem Iqbal
(74) *Attorney, Agent, or Firm* — Cuenot, Forsythe & Kim, LLC

(57) ABSTRACT

During execution of a unit test, receiving from the unit test a first request referencing a mock object. An instance of the mock object and initial cached mock object data is returned to the test unit, wherein the initial cached mock object data includes first data for a real object represented by the mock object. Second data for the real object represented by the mock object is collected. The second data for the real object is compared to the initial cached mock object data. Responsive to determining that at least one aspect of the second data for the real object does not correspond to the initial cached mock object data, the cached mock object data is updated with the second data for the real object. An indication can be provided to the unit test that the initial cached mock object data returned to the unit test is unreliable.

20 Claims, 2 Drawing Sheets

RELIABLE UNIT TESTING THROUGH CACHED MOCKING

BACKGROUND

In computer programming, unit testing is a method in which individual units of source code, one or more computer program modules together with associated control data, usage procedures and operating procedures are tested to determine if they are fit for use. Intuitively, a unit can be considered as a small testable part of an application. A unit may be an entire module, but more commonly is an individual function or procedure. In object-oriented programming a unit is often an entire interface, such as a class, but also may be an individual method. Unit tests typically are created by programmers, but occasionally may be created by white box testers during the development process.

Ideally, each unit test is independent from the others: substitutes such as method stubs, mock objects, fakes and test harnesses can be used to assist testing a module in isolation. Unit tests typically are written and executed by software developers to ensure that program code meets its design and behaves as intended. Implementation of a unit test oftentimes is formalized as part of build automation.

BRIEF SUMMARY

One or more embodiments disclosed within this specification relate to unit testing a mock object using cached data.

An embodiment can include, during execution of a unit test, receiving from the unit test a first request referencing a mock object. An instance of the mock object and initial cached mock object data can be returned to the test unit, wherein the initial cached mock object data includes first data for a real object represented by the mock object. Second data for the real object represented by the mock object can be collected, and the second data for the real object can be compared to the initial cached mock object data.

Responsive to determining that at least one aspect of the second data for the real object does not correspond to the initial cached mock object data, the cached mock object data can be updated with the second data for the real object. Further, an indication can be provided to the unit test that the initial cached mock object data returned to the unit test is unreliable.

Another embodiment can include a system having a processor. The processor can be configured to initiate executable operations including, during execution of a unit test, receiving from the unit test a first request referencing a mock object. The processor can return an instance of the mock object and initial cached mock object data to the test unit, wherein the initial cached mock object data includes first data for a real object represented by the mock object. The processor can collect second data for the real object represented by the mock object, and compare the second data for the real object to the initial cached mock object data.

Responsive to determining that at least one aspect of the second data for the real object does not correspond to the initial cached mock object data, the processor can update the cached mock object data with the second data for the real object. Further, the processor can provide an indication to the unit test that the initial cached mock object data returned to the unit test is unreliable.

Another embodiment can include a computer program product for unit testing a mock object using cached data. The computer program product can include a computer-readable storage medium having stored thereon program code that, when executed, configures a processor to perform operations including, during execution of a unit test, receiving from the unit test a first request referencing a mock object. An instance of the mock object and initial cached mock object data can be returned to the test unit, wherein the initial cached mock object data includes first data for a real object represented by the mock object. Second data for the real object represented by the mock object can be collected, and the second data for the real object can be compared to the initial cached mock object data.

Responsive to determining that at least one aspect of the second data for the real object does not correspond to the initial cached mock object data, the cached mock object data can be updated with the second data for the real object. Further, an indication can be provided to the unit test that the initial cached mock object data returned to the unit test is unreliable.

DETAILED DESCRIPTION

Figure 1:
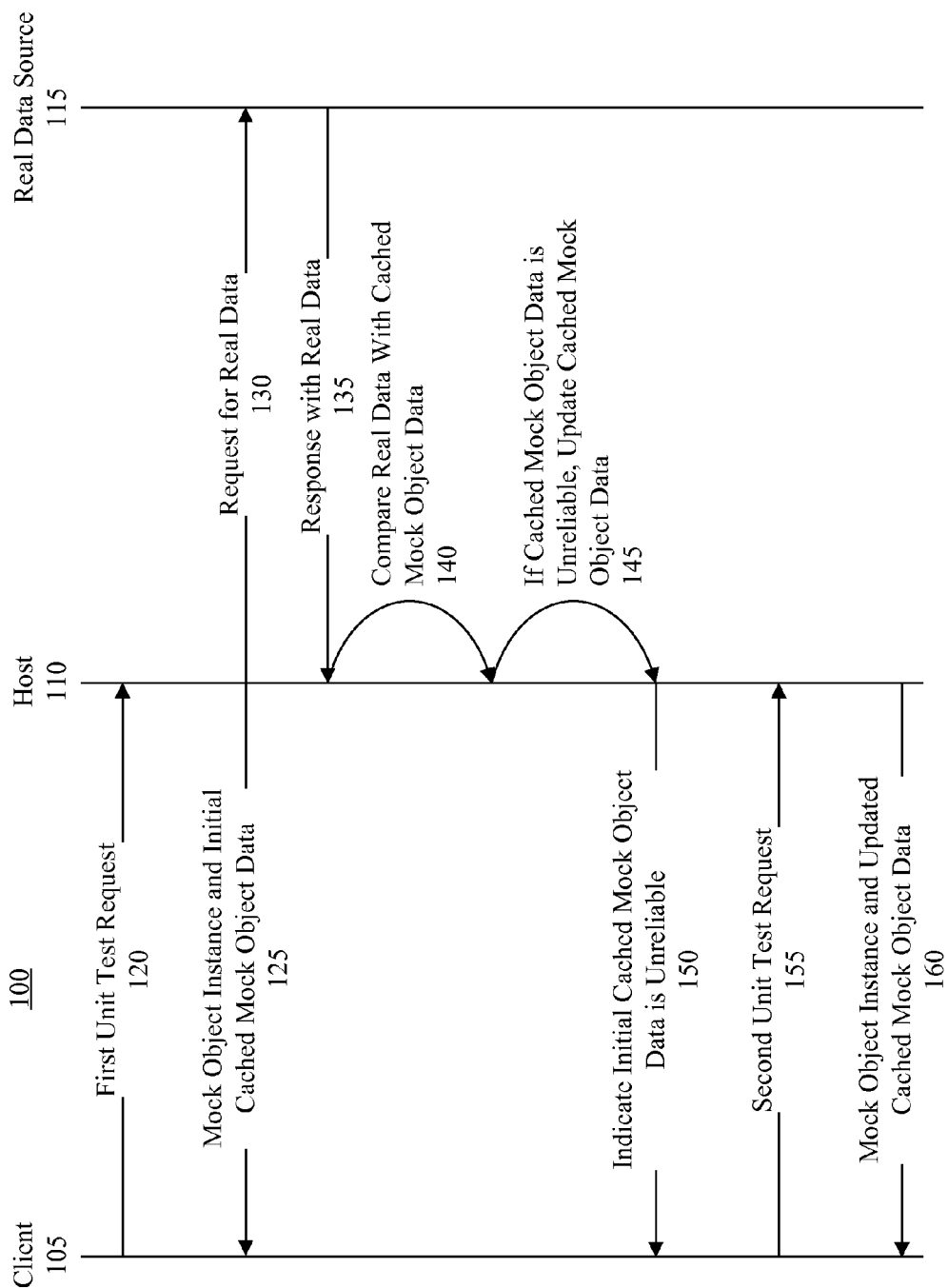
FIG. 1 is a flow diagram illustrating a process of unit testing a mock object using cached data in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram illustrations and/or block diagrams of methods, apparatus (systems), and computer program products according to embodiments of the invention. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Several definitions that apply throughout this document will now be presented. As used herein, the term "mock object" means, in object-oriented programming, a simulated object that mimics the behavior of a real object in a controlled way. In this regard, a programmer typically creates a mock object to test the behavior of some other real object. As used herein, the term "cached mock object data" means data generated for a real world object represented by the mock object, and stored for use with the mock object when the mock object is used to test the behavior of the real object. As used herein, the term "object" means an instance of a comprising consisting data fields, methods, together with their interactions.

FIG. 1 is a flow diagram illustrating a process 100 of unit testing a mock object using cached data in accordance with one embodiment disclosed within this specification. The process 100 can include a plurality of data exchanges between a client 105 executing a unit test and a host 110, and between the host 110 and a real data source 115 that provides real data for an application under test. The client 105 can be an application or service configured to execute one or more unit tests. The host 110 can be an application or service configured to receive requests generated by the unit test(s), and provide to the unit test(s) one or more instances of mock objects and corresponding mock object data. The real data source 115 can provide data associated with real objects represented by the mock objects. For example, the real data source 115 can be a data table, a data base, or any other data structure configured to store data for objects.

The client 105, host 110 and real data source 115 each can be initialized on a single processing system (e.g., a computer, server, or the like), or on two or more processing systems that are communicatively linked, for example via one or more input/output controllers. In this regard, the two or more processing systems can be communicatively linked via one or more communication networks, for example via a LAN, a WAN and/or the Internet.

In operation, at step 120, the host 110 can receive from the client 105 a first request generated by a unit test that identifies a mock object. In response, at step 125 the host 110 can return to the client 105 an instance of the mock object and initial cached data for the mock object maintained by the host 110. The initial cached mock object data includes first data for a real object represented by the mock object. The first data can be data retrieved in response to previous unit test requests, or data generated specifically for unit testing of the mock object. The host can maintain the cached mock object data locally on a particular processing system on which the host is executed (or instantiated), or on another system to which the processing system is communicatively linked.

Also in response to step 120, at step 130, the host can communicate a request to the real data source 115 requesting real data for the real object represented by the mock object. At step 135, the host 110 can receive from the real data source 115 a response to that includes the real data, and collect such data as second data for the real object represented by the mock object.

In one aspect, if the host 110 currently does not have cached mock object data for the identified mock object when the first unit test request is received at step 120, the host 110 can wait to send the response at step 125 until steps 130 and 135 are complete. In this case, when steps 130 and 135 have completed, the host 110 can update the cashed mock object data with the real data received at step 135. Then, at step 125, the host 110 can return to the client 105 an instance of the mock object and the cashed mock object data, which in this instance corresponds to the real data received at step 135.

At step 140, the host 110 can compare the second data for the real object to the initial cached mock object data. If certain aspects of the second data correspond to the initial cached mock object data, the process can end. In illustration, if fields identified in the second data correspond to fields identified in the initial cached mock object data, the second data can be considered to be sufficiently correlated with the initial cached mock object data, even though data within the respective fields may vary. If however, the fields of the second data do not correlate with the fields of the initial cached mock object data, a determination can be made that at least one aspect of the second data for the real object does not correspond to the initial cached mock object data. Such determination can be made, for example, if field names have changed in the second data in comparison to the at least one aspect of the second data for the real object does not correspond to the initial cached mock object data, fields have deleted, fields have been added, fields have been transposed, etc. In another arrangement, the determination can be made if the data for a given field is outside of an expected range.

At step 145, responsive to determining that at least one aspect of the second data for the real object does not correspond to the initial cached mock object data (e.g., one or more defined data fields do not correlate), the initial cached mock object data can be identified as being unreliable, and the cached mock object data can be updated with the second data. At step 150, the host 110 can communicate a message to the client 105 indicating that the initial cached mock object data is unreliable. In response, the client 105 can make a determination to rerun the unit test. Accordingly, at step 155, the host 110 can receive from the client 105 a second request generated by the unit test that identifies a mock object. In response, at step 160 the host 110 can return to the client 105 an instance of the mock object and the updated cached data for the mock object. The process can proceed to step 130 and continue until the real data received from the real data source 115 correlates with the cached mock object data.

Figure 2:
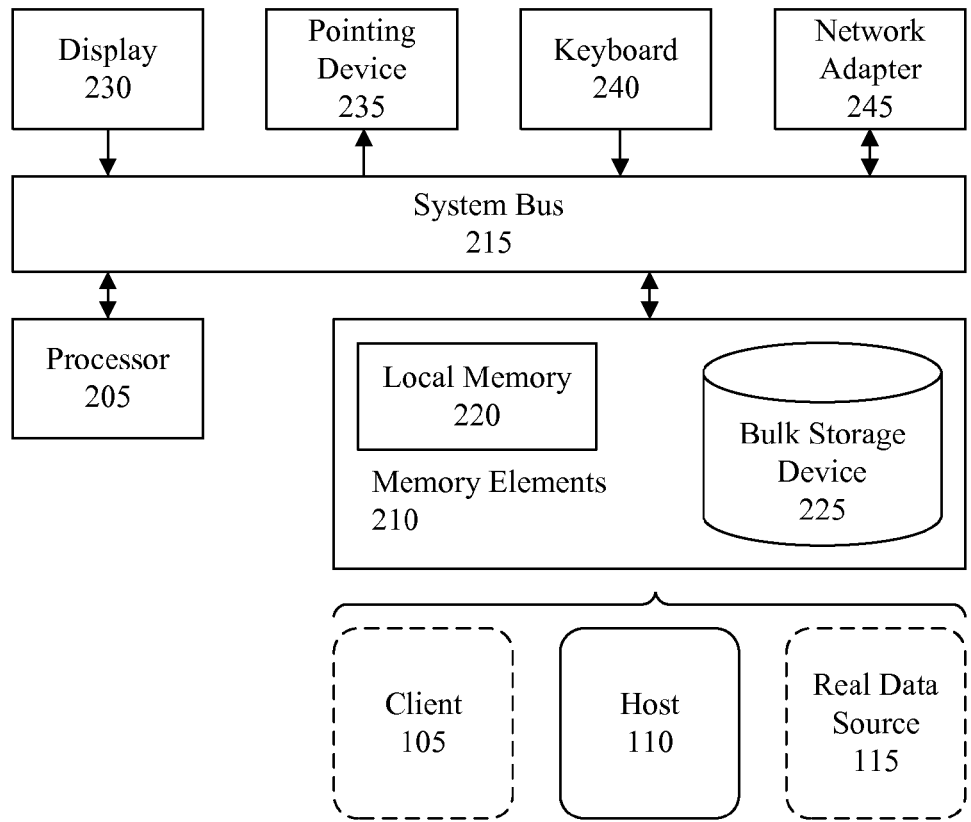
FIG. 2 depicts a block diagram of a processing system configured to support unit testing of a mock object using cached data in accordance with another embodiment disclosed within this specification.

FIG. 2 depicts a block diagram of a processing system 200 configured to support unit testing of a mock object using cached data in accordance with an embodiment disclosed within this specification. For example, the processing system 200 can execute the host 110 if FIG. 1. The processing system 200 also can host the client 105 and/or the real data source 115 of FIG. 1, though this need not be the case. In other words, the client 105 and/or the real data source 115 can be hosted on one or more other processing systems.

The processing system 200 can include at least one processor 205 coupled to memory elements 210 through a system bus 215 or other suitable circuitry. As such, the processing system 200 can store program code within the memory elements 210. The processor 205 can execute the program code accessed from the memory elements 210 via the system bus 215. In one aspect, for example, the processing system 200 can be implemented as a computer that is suitable for storing and/or executing program code. It should be appreciated, however, that processing system 200 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to RAM or other non-persistent memory device(s) generally used during actual execution of the program code. The bulk storage device(s) 225 can be implemented as a hard disk drive (HDD), solid state drive (SSD), or other persistent data storage device. The processing system 200 also can include one or more cache memories (not shown) that provide temporary storage of at least some program code in order to reduce the number of times program code must be retrieved from the bulk storage device 225 during execution.

Input/output (I/O) devices such as a display 230, a pointing device 235 and a keyboard 240 can be coupled to the processing system 200. The I/O devices can be coupled to the processing system 200 either directly or through intervening I/O controllers. For example, the display 230 can be coupled to the processing system 200 via a graphics processing unit (GPU), which may be a component of the processor 205 or a discrete device. One or more network adapters 245 also can be coupled to processing system 200 to enable processing system 200 to become coupled to other systems, computer systems, remote printers, and/or remote storage devices through intervening private or public networks. Modems, cable modems, and Ethernet cards are examples of different types of network adapters 245 that can be used with processing system 200.

As pictured in FIG. 2, the memory elements 210 can store the host 110 of FIG. 1. Being implemented in the form of executable program code, the host 110 can be executed by the processing system 200 and, as such, can be considered part of the processing system 200. In illustration, the host 110 can be executed by the processor 205, thus configuring the processor to initiate executable operations to perform various functions described herein.

Optionally, the memory elements 210 also can store the client 105 and/or the real data source 115, in which case the client 105 and/or the real data source 115 can be considered part of the processing system 200. Otherwise, the client 105 and/or the host 110 can be communicatively linked to the processing system 200, for example via the network adapter 245.

Like numbers have been used to refer to the same items throughout this specification. The flow diagram and block diagram in the Figures illustrate the architecture, functionality, and operation of possible implementations of systems, methods and computer program products according to various embodiments of the present invention. In this regard, each block in the flow diagram or block diagram may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flow diagram illustration, and combinations of blocks in the block diagram and/or flow diagram illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "includes," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of unit testing a mock object using cached data, the method comprising:
   during execution of a unit test, receiving from the unit test a first request referencing a mock object;
   returning to the unit test an instance of the mock object and initial cached mock object data, wherein the initial cached mock object data includes first data for a real object represented by the mock object;
   collecting second data for the real object represented by the mock object;
   comparing the second data for the real object to the initial cached mock object data;
   responsive to determining that at least one aspect of the second data for the real object does not correspond to the initial cached mock object data;
   via a processor, updating the cached mock object data with the second data for the real object; and
   indicating to the unit test that the initial cached mock object data returned to the unit test is unreliable.

2. The method of claim 1, wherein:
   responsive indicating to the unit test that the initial cached mock object data returned to the unit test is unreliable, the unit test is re-executed.

3. The method of claim 2, further comprising:
   during re-execution of a unit test, receiving from the unit test a second request referencing the mock object; and
   returning to the unit test another instance of the mock object and the updated cached mock object data, wherein the updated cached mock object data includes the second data for a real object represented by the mock object.

4. The method of claim 1, wherein collecting second data for the real object represented by the mock object includes:
   collecting data from a data table, the data from the data table identifying at least one field of the data table and at least one record in the data table.

5. The method of claim 4, wherein determining that at least one aspect of the second data for the real object does not correspond to the initial cached mock object data includes:
   determining that the at least one field of the data table does not correspond to a field identified in the cached mock object data.

6. The method of claim 1, wherein receiving from the unit test the first request referencing the mock object includes:
   receiving the first request from a client executing the first unit test.

7. The method of claim 1, wherein collecting second data for the real object represented by the mock object includes:
   initiating a background task to collect the second data for the real object represented by the mock object.

8. A system comprising:
   a processor configured to initiate executable operations comprising:
   during execution of a unit test, receiving from the unit test a first request referencing a mock object;
   returning to the unit test an instance of the mock object and initial cached mock object data, wherein the initial cached mock object data includes first data for a real object represented by the mock object;
   collecting second data for the real object represented by the mock object;
   comparing the second data for the real object to the initial cached mock object data;
   responsive to determining that at least one aspect of the second data for the real object does not correspond to the initial cached mock object data;
   updating the cached mock object data with the second data for the real object; and
   indicating to the unit test that the initial cached mock object data returned to the unit test is unreliable.

9. The system of claim 8, wherein:
   responsive indicating to the unit test that the initial cached mock object data returned to the unit test is unreliable, the unit test is re-executed.

10. The system of claim 9, wherein the executable operations further include:
    during re-execution of a unit test, receiving from the unit test a second request referencing the mock object; and returning to the unit test another instance of the mock object and the updated cached mock object data, wherein the updated cached mock object data includes the second data for a real object represented by the mock object.

11. The system of claim 8, wherein collecting second data for the real object represented by the mock object includes:
   collecting data from a data table, the data from the data table identifying at least one field of the data table and at least one record in the data table.

12. The system of claim 11, wherein determining that at least one aspect of the second data for the real object does not correspond to the initial cached mock object data includes:
   determining that the at least one field of the data table does not correspond to a field identified in the cached mock object data.

13. The system of claim 8, wherein receiving from the unit test the first request referencing the mock object includes:
   receiving the first request from a client executing the first unit test.

14. The system of claim 8, wherein collecting second data for the real object represented by the mock object includes:
   initiating a background task to collect the second data for the real object represented by the mock object.

15. A computer program product for unit testing a mock object using cached data, the computer program product comprising:
   a computer-readable storage medium having stored thereon program code that, when executed, configures a processor to perform executable operations comprising:
   during execution of a unit test, receiving from the unit test a first request referencing a mock object;
   returning to the unit test an instance of the mock object and initial cached mock object data, wherein the initial cached mock object data includes first data for a real object represented by the mock object;
   collecting second data for the real object represented by the mock object;
   comparing the second data for the real object to the initial cached mock object data;
   responsive to determining that at least one aspect of the second data for the real object does not correspond to the initial cached mock object data;
   updating the cached mock object data with the second data for the real object; and
   indicating to the unit test that the initial cached mock object data returned to the unit test is unreliable.

16. The computer program product of claim 15, wherein:
   responsive indicating to the unit test that the initial cached mock object data returned to the unit test is unreliable, the unit test is re-executed.

17. The computer program product of claim 16, wherein the program code further configures the processor to perform executable operations comprising:
   during re-execution of a unit test, receiving from the unit test a second request referencing the mock object; and
   returning to the unit test another instance of the mock object and the updated cached mock object data, wherein the updated cached mock object data includes the second data for a real object represented by the mock object.

18. The computer program product of claim 15, wherein collecting second data for the real object represented by the mock object includes:
   collecting data from a data table, the data from the data table identifying at least one field of the data table and at least one record in the data table.

19. The computer program product of claim 18, wherein determining that at least one aspect of the second data for the real object does not correspond to the initial cached mock object data includes:
   determining that the at least one field of the data table does not correspond to a field identified in the cached mock object data.

20. The computer program product of claim 15, wherein receiving from the unit test the first request referencing the mock object includes:
   receiving the first request from a client executing the first unit test.

* * * * *